United States Patent Office 3,792,116
Patented Feb. 12, 1974

---

3,792,116
FLAME-RESISTANT POLYMERIC COMPOSITIONS CONTAINING BROMINATED ADDUCTS OF ACYCLIC TRIENES
Carlos G. Cardenas, Jacksonville, Fla., and Donnie G. Brady, Bartlesville, Okla., assignors to Phillips Petroleum Company
No Drawing. Original application Jan. 2, 1970, Ser. No. 416, now Patent No. 3,697,607. Divided and this application Apr. 19, 1972, Ser. No. 245,381
Int. Cl. C09k 3/28
U.S. Cl. 260—861                 14 Claims

ABSTRACT OF THE DISCLOSURE

Flame-resistant polymeric compositions containing novel brominated adducts of acyclic trienes with halocyclopentadienes and with substituted halocyclopentadienes are disclosed. Methods of preparing said novel compounds are also disclosed.

---

This application is a division of copending application Ser. No. 416, filed Jan. 2, 1970, now Pat. No. 3,697,607.

This invention relates to novel brominated adducts of acyclic trienes.

We have now discovered that new and useful brominated adducts of acyclic triene compounds can be prepared by reacting said triene compounds with a halocyclopentadiene or with a substituted halocyclopentadiene to form said adducts, and then brominating said adducts.

An object of this invention is to provide new and useful brominated adducts of acyclic triene compounds. Another object of this invention is to provide methods of preparing said brominated adducts. Other aspects, objects, and advantages of the invention will be apparent to those skilled in the art in view of this disclosure.

Thus, according to the invention claimed in said copending application, there are provided as new compounds, the brominated monoadducts of (a) an acyclic triene compound containing 8 carbon atoms per molecule and at least one terminal carbon to carbon double bond, with (b) a halocyclopentadiene having the formula

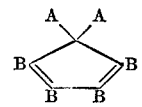

wherein: each A is selected from the group consisting of chlorine, bromine, fluorine, hydrogen, R, and —OR wherein R is an alkyl or aryl radical containing from 1 to 10 carbon atoms; and each B is selected from the group consisting of chlorine, bromine, and fluorine; said brominated monoadducts being characterized by the presence of a

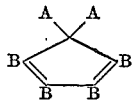

radical, where A and B are as defined above, attached to the carbon atoms in the 1 and 2 positions of said triene, a carbon to carbon double bond between the carbon atoms in the 3 and 4 positions of said triene, and two bromine atoms attached to adjacent carbon atoms in the 5 and 6, the 6 and 7, or the 7 and 8 positions, of said triene.

Further according to the invention claimed in said copending application, there are provided methods of preparing said novel brominated adducts, which methods comprise reacting a monoadduct of an acyclic triene compound and a halocyclopentadiene with bromine so as to add two atoms of bromine to said adduct in particular positions.

According to the invention claimed in this application, there are provided flame-resistant polymeric compositions comprising a polymer and an effective fire retardant proportion of a said brominated adduct.

Acyclic trienes which can be used to form the monoadducts which are used in the practice of the invention include the hydrocarbon acyclic trienes containing 8 carbon atoms per molecule and at least one terminal carbon to carbon double bond. Preferably, said cyclic trienes are selected from the linear octatrienes and the methylheptatrienes. Said acyclic triene compounds are known in the art and can be prepared by methods known in the art, among others, the following: 1,3,6-octatriene, 1,3,7-octatriene; 5-methyl-1,3,6-heptatriene; 5 - methyl - 1,3,5-heptatriene; and 3-methyl-1,3,5-heptatriene, and the like, and mixtures thereof.

Halocyclopentadienes which can be used to form the monoadducts which are used in the practice of the invention include those which can be represented by the formula

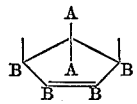

wherein: each A is selected from the group consisting of chlorine, bromine, fluorine, hydrogen, R, and —OR wherein R is an alkyl or aryl radical containing from 1 to 10 carbon atoms, preferably from 1 to 6 carbon atoms; and each B is selected from the group consisting of chlorine, bromine, and fluorine. The preferred halocyclopentadienes are those wherein all the A substituents are the same, and all the B substituents are the same. More preferably, all the A and B substituents are all the same. The most preferred halocyclopentadiene is hexachlorocyclopentadiene.

Specific examples of the above-described halocyclopentadienes includes, among others, the following:

hexachlorocyclopentadiene;
5,5-dimethoxytetrachlorocyclopentadiene;
hexabromocyclopentadiene;
5,5-difluorotetrachlorocyclopentadiene;
5,5-dibromotetrachlorocyclopentadiene;
5,5-diethoxytetrachlorocyclopentadiene;
5,5-didecyltetrachlorocyclopentadiene;
5,5-diphenoxytetrafluorocyclopentadiene;
hexafluorocyclopentadiene, and the like, and mixture thereof.

In one method of preparing the monoadducts which are used as starting materials in preparing the brominated adducts of the invention, a suitable halocyclopentadiene and a suitable acyclic triene compound are mixed and reacted under suitable reaction conditions. Generally speaking, said reaction conditions include a temperature within the range of from about 40 to about 200° C., preferably from about 75 to about 130° C. The pressure is not critical and any convenient pressure which is suitable for maintaining the reaction mixture in a substantially liquid phase can be used. The reaction can be carried out either in the presence or in the absence of an inert diluent such as toluene, benzene, carbon tetrachloride, and the like. The reaction time will depend to some extent upon the desired degree of conversion but in most instances will generally be within the range of from about 0.5 to about 30 hours, preferably within the range of about 2 to about 20 hours. The mol ratio of halocyclopentadiene to acyclic triene can be in the range of from 0.1:1 to 10:1, depending upon the specific adduct and yields desired. For example, a ratio of 0.7 to 1.1 is convenient for monoadduct formation.

The above-described monoadducts, and methods for their preparation, are disclosed and claimed in copending application Ser. No. 442, filed Jan. 2, 1970, by C. G. Cardenas, now abandoned.

Examples of said monoadducts which are used as starting materials in the practice of the invention include, among others, those which can be represented by the following formulas:

TABLE A

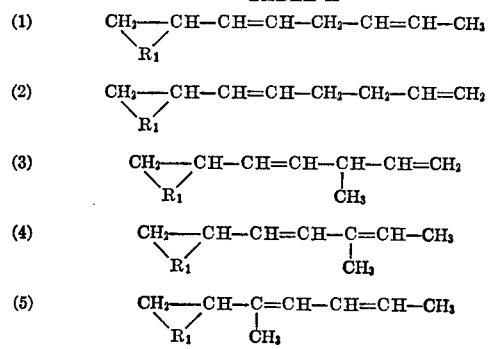

wherein each $R_1$ is a

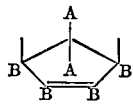

radical wherein each A and each B is as defined above in connection with said halocyclopentadienes.

The above-described monoadduct starting materials can be brominated at temperatures within the range of from about −40 to about 70° C., preferably from about −10 to about 20° C., in the presence of an inert diluent such as carbon tetrachloride, chloroform, carbon disulfide, butane, other inert hydrocarbons, dichloromethane, 1,2-dichloroethane, trifluoromethane, other suitable fluorinated hydrocarbons, and the like, and mixtures of said diluents. The diluent is generally present in amounts ranging from about 10 to about 95 volume percent of the total reaction mixture.

Generally speaking, about 0.8 to about 1.2 equivalents of bromine are used for each double bond equivalent which it is desired to brominate, although greater or lesser amounts can sometimes be employed. The bromine is generally added to the solution of the adduct in the dark and at a rate consistent with the rate at which it is reacted. The total addition and reaction time can vary within wide limits, but will generally be in the range of from about 5 minutes to about 24 hours. The pressure under which the bromination is carried out is relatively non-critical and can be in any convenient range in which the reaction mixture is maintained in the liquid state. If desired, bromination catalysts or promoters can be present in the reaction mixture in minor amounts. Thus, such materials as alkanols, alumina, aluminum halides, aluminum halide-complexes, and the like can be used.

Examples of the novel brominated adducts of acyclic trienes which are products of the invention include, among others, those which can be represented by the following formulas:

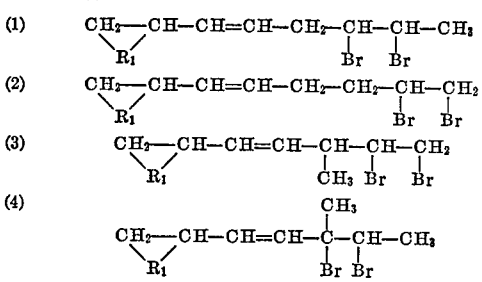

(5) $\underset{R_1}{CH_2\!\!-\!\!\!-\!\!CH}\!\!-\!\!CH\!\!=\!\!CH\!\!-\!\!\underset{Br}{CH}\!\!-\!\!\underset{Br}{CH}\!\!-\!\!CH_3$
            $CH_3$ wherein each $R_1$ is as defined above in connection with said halocyclopentadienes.

It will be noted that the above brominated adducts of the invention are dibromides, i.e., they contain only two atoms of bromine. This was a surprising and unexpected result. When similar monoadducts, made from acyclic trienes containing 10 carbon atoms per molecule, were brominated under substantially the same conditions, both of the carbon to carbon double bonds were brominated. However, as shown in the examples hereinafter, in the mono-adducts made from acyclic trienes containing 8 carbon atoms, bromine added to only one of the carbon to carbon double bonds, even when subjected overnight to brominating conditions.

The novel brominated adducts of the invention are useful as flame retardants in polymers or polymeric compositions, as fungicides, as plant growth regulators, and as extreme pressure additives for lubricating oils. Normally flammable polymeric materials which can be rendered flame resistant by incorporating therein a brominated adduct of the invention include both homopolymers and copolymers. Preferred materials include those selected from the group consisting of polyethylenes, polypropylenes, copolymers of ethylene and butene, polyisobutylenes, polystyrenes, and polyesters. Polymers of monomers comprising at least one of: conjugated dienes, preferably having 4 to 10 carbon atoms per molecule; monovinyl-substituted aromatic compounds, preferably having 8 to 10 carbon atoms per molecule; acrylonitrile; methylacrylate; and methylmethacrylate can also be used. Examples include homopolymers of butadiene, isoprene, decadiene, styrene, vinylnaphthalene, acrylonitrile, methylacrylate, and methylmethacrylates; and copolymers (random, block or graft) of butadiene and styrene, of butadiene, styrene, and acrylonitrile, of acrylonitrile and vinylpyridine, and of acrylonitrile and vinylchloride. Blends of mixtures of the above-described polymeric compositions can also be used. Polyester resins can also be used as the polymeric material which can be rendered flame resistant. A typical polyester resin is the reaction product of phthalic anhydride, maleic anhydride, and propylene glycol which has been crosslinked with a monomer such as styrene using a peroxide catalyst.

The flame-resistant compositions of the invention can be prepared in any suitable manner. For example, intimate mixtures of the polymeric material and the flameproofing agents of the invention can be prepared by mixing a composition and the flameproofing agent at an elevated temperature in an extrusion press or a kneader. The materials can also be dissolved in a common solvent, and the solvent subsequently removed. In the case of granular or bead-like plastic compositions, the surface of the granule may be coated.

The flame-resistant polymeric composition of the invention can also have therein the usual fillers, dyes, pigments, plasticizers, antistatic agents, stabilizing agents, and the like, if desired. Such compounds are well known in the art and for the sake of brevity no specific examples are named here.

The brominated adduct flameproofing agents of the invention can be incorporated in said polymeric compositions in small but effective fire retardant proportions. As a guide to those skilled in the art, said brominated adducts can be incorporated in said polymeric materials in amounts of from 1 to 20, preferably 1.5 to 10, more preferably 1.5 to 5, parts by weight per 100 parts by weight of polymer.

If desired, improved fire retardance can be provided by also incorporating in the polymeric composition metallic compounds such as those wherein the metal is selected from the group consisting of antimony, arsenic, and bismuth. Antimony oxide is a presently preferred metallic compound. Said antimony oxide, when used, is usually used in an amount within the range of from 0.5 to 20 parts by weight per 100 parts by weight of polymer. A weight ratio of brominated adduct to antimony oxide of about 2:1 can be used, but other ratios can also be used.

The following examples will serve to further illustrate the invention.

EXAMPLE I

The hexachlorocyclopentadiene adducts of a number of acyclic trienes were prepared by placing the desired amounts of hexachlorocyclopentadiene and triene compound in a glass-walled reaction vessel, and sealing the contents under a nitrogen atmosphere. The contents were then maintained under reaction conditions of time and temperature stated hereinafter. The reaction vessel was placed in an oil bath and stirred magnetically at the desired temperature. When the indicated time had elapsed, the reaction vessel was permitted to come to room temperature, and the reaction mixture distilled. The products obtained were colorless to light yellow oils which distilled readily at reduced pressure.

Table I given below shows the significant reaction and conditions and the results obtained in these runs.

Table II given below sets forth the analytical data obtained by the examination of the adducts prepared and shown in Table I. In addition to the molecular weight determinations and the elemental analyses, the product adducts were subjected to examination by NMR spectroscopy. The sepctra obtained were found to be consistent with the indicated structures.

brominated by charging a 7.6 g. (0.020 mol) quantity of the above adduct into a 200 ml. glass vessel together with 20 ml. of methylene chloride and 0.5 g. sodium bicarbonate. The vessel was fitted with a dropping funnel, condenser, stirrer, and was cooled by immersion in an ice-salt bath. The dropping funnel contained 6.4 g. (0.040 mol) of bromine mixed with 0.5 ml. of absolute ethanol and 25 ml. of methylene chloride.

The bromine solution was added, slowly and in the dark, to the contents of the 200 ml. vessel. However, after about one-half of the bromine solution was added, no more bromine was reacted as evidenced by the presence of red color in the vessel contents which refused to decolorize. The addition of bromine solution was stopped and the reaction mixture was allowed to stand overnight after which time it was still red in color.

The reaction mixture was washed with one 10 ml. portion of 5% aqueous sodium bisulfite to destroy residual bromine, and two 20 ml. portions of aqueous sodium bicarbonate solution until it was neutral to litmus. The reaction mixture was then stirred over anhydrous magnesium sulfate for 2 hours, filtered, and stripped of solvent by distillation.

A 9.55 g. quantity of a yellow, very viscous oil was recovered. Its infrared spectrum was consistent with the structure $$CH_2\!\!-\!\!CH\!-\!CH\!=\!CH\!-\!CH\!-\!CH\!-\!CH_3$$
$$\diagdown\!R_1\!\diagup \qquad\qquad\;\; CH_3\;\; Br\;\; Br$$

wherein $R_1$ is as defined in Table I above. Elemental analysis of said oil showed 28.7% carbon (28.9 calc.), 2.3% hydrogen (2.2 calc.), 39.0% Cl (39.3 calc.), and

TABLE I.—HEXACHLOROCYCLOPENTADIENE ADDUCTS OF ACYCLIC TRIENES

| Acyclic triene | $C_5Cl_6$/triene, mol ratio | Temp., °C. | Time, hrs. | Adduct [a] |
|---|---|---|---|---|
| Run number: | | | | |
| 1 ........ 5-methyl-1,3,6-heptatriene | 1/1 | 90 | 6 | $CH_2\!\!-\!\!CH\!-\!CH\!=\!CH\!-\!CH\!-\!CH\!=\!CH_2$ <br> $\diagdown R_1 \diagup \qquad\qquad\; CH_3$ |
| 2 ........ 1,3,6-octatriene | 1/1 | 90 | 17 | $CH_2\!\!-\!\!CH\!-\!CH\!=\!CH\!-\!CH_2\!-\!CH\!=\!CH\!-\!CH_3$ <br> $\diagdown R_1 \diagup$ |
| 3 ........ 1,5,9-decatriene | [b] 1/5 | 75-80 | 16.5 | $CH_2\!\!-\!\!CH\!-\!CH_2\!-\!CH_2\!-\!CH\!=\!CH\!-\!CH_2\!-\!CH_2\!-\!CH\!=\!CH_2$ <br> $\diagdown R_1 \diagup$ |

[a] See the following formula:

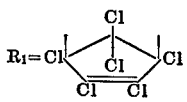

[b] $C_5Cl_6$ added dropwise over a period of 30 minutes with stirring. Stirring then continued for another 16 hours.

TABLE II.—ANALYTICAL DATA ON HEXACHLOROCYCLOPENTADIENE ADDUCTS OF ACYCLIC TRIENES

| | | | Percent | | | | | | |
|---|---|---|---|---|---|---|---|---|---|
| | Mol wt. | | Carbon | | Hydrogen | | Chlorine | | Boiling point, °C. |
| Run No. Adduct [a] | Calcd. | Found | Calcd. | Found | Calcd. | Found | Calcd. | Found | |
| 1 ....... $CH_2\!\!-\!\!CH\!-\!CH\!=\!CH\!-\!CH\!-\!CH\!=\!CH_2$ <br> $\diagdown R_1 \diagup \qquad\qquad\; CH_3$ | 381 | 390 | 41.0 | 41.0 | 3.2 | 3.2 | 55.8 | 53.6 | [b] 104 |
| 2 ....... $CH_2\!\!-\!\!CH\!-\!CH\!=\!CH\!-\!CH_2\!-\!CH\!=\!CH\!-\!CH_3$ <br> $\diagdown R_1 \diagup$ | 381 | 381 | 41.0 | 41.3 | 3.2 | 3.3 | 55.8 | 55.2 | [c] 111 |

[a] See the following formula:

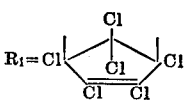

[b] 0.09 mm.
[c] 0.04 mm.

EXAMPLE II

The hexachlorocyclopentadiene monoadduct of 5-methyl-1,3,6-heptatriene (structure shown in Table I) was 31% Br (29.6 calc.). The molecular weight of said oil was found to be 540 (541 calc.).

It will be noted that the remaining carbon to carbon double bond in the above brominated product was not brominated, even after the reaction mixture was permitted to stand overnight with an excess of bromine present. This was a surprising and unexpected result.

EXAMPLE III

A sample of the hexachlorocyclopentadiene monoadduct of 1,3,6-octatriene (structure shown in Table I above) was brominated in substantially the same manner as set forth in Example II above. The recovered brominated product was found to have a structure consistent with the formula

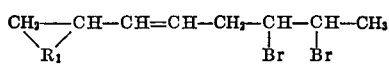

where $R_1$ is as defined in Table I above.

EXAMPLE IV

The hexachlorocyclopentadiene monoadduct of 1,5,9-decatriene (structure shown in Table I) was brominated by charging 12.5 g. (0.0304 mol) of this material into a 500 ml., 3-neck, round-bottom flask equipped with a stopper, a dropping funnel, and a condenser with a drying tube. Along with this unsaturated adduct there was placed a small quantity (0.5 g.) of sodium bicarbonate and 200 ml. of dichloromethane. The flask was cooled in an ice-salt bath and the contents were stirred magnetically. A solution consisting of 10.0 g. (0.062 mol) of bromine and 2.0 ml. of absolute ethanol in 100 ml. of dichloromethane was placed in the dropping funnel and added slowly over about 2 hours. Care was taken to keep the reaction cold and to exclude light.

After the addition was complete, the reaction mixture was stirred at —5° C. for 1 additional hour after which time it was washed successively with a 20 ml. portion of 5% sodium bisulfite, two 10 ml. portions of 5% portions of sodium bicarbonate, and two 10 ml. portions of water. The organic solution was dried over anhydrous magnesium sulfate. Following filtration, the solvent was removed at room temperature in a rotary evaporator yielding a near quantitative yield of a yellow gum product which was found to be the tetrabromide. Both infrared and NMR examination of said product produced spectra which were consistent with the structure

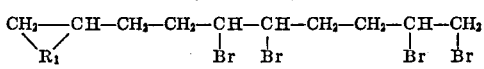

where $R_1$ is as defined in Table I above. Elemental analysis of said product showed 25.2% carbon (24.7 calculated), and 2.4% hydrogen (2.2 calculated).

EXAMPLE V

The utility of the brominated adducts was demonstrated in several runs in which two different adducts were each incorporated into four commercial solid polymer compositions. In each of these runs, the bromine-containing compound was accompanied by about 3–5 php. of an antimony oxide fire retarding synergist. These compositions were then tested for fire retardancy according to ASTM D-635. Table III below shows the results of the tests.

TABLE III.—FIRE RETARDANCY TESTS

| Polymer | Brominated adduct (php.) of— | | ASTM D-635 classification |
|---|---|---|---|
| | Example II | Example III | |
| Polypropylene | 2 | 1.5 | Self-extinguishing. |
| Polystyrene | 3 | 3 | Do. |
| Polyethylene | 10 | 5 | Do. |
| Polyester | | 5 | Do. |

The above data show that the brominated adducts of the invention are effective fire retarding agents.

The monoadducts used as starting materials in the practice of the invention can, of course, be named. For example, the hexachlorocyclopentadiene monoadduct represented by Formula 1 in the above Table A is 1,2,3,4,7,7-hexachloro - 5 - (1,4 - hexadienyl)-bicyclo(2.2.1)-2-heptene. However, said names are obviously long and cumbersome. For this reason said monoadducts, and other similar compounds, including the brominated derivatives, and specific examples thereof have been represented by formulas which are considered to be more illustrative.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

We claim:

1. A flame-resistant polymeric composition comprising a normally flammable polymer and an effective fire-retardant proportion of a bromine compound characterized by:
   an acrylic carbon chain containing a total of 8 carbon atoms and from 7 to 8 carbon atoms in the linear portion of said chain;
   the presence of a

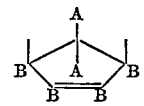

radical attached to the carbon atoms in the 1 and 2 positions in the linear portion of said chain; in said radical, each A is selected from the group consisting of chlorine, bromine, fluorine, hydrogen, R, and —OR wherein R is an alkyl or aryl radical containing from 1 to 10 carbon atoms, and each B is selected from the group consisting of chlorine, bromine, and fluorine;
   a carbon to carbon double bond between the carbon atoms in the 3 and 4 positions in the linear portion of said chain; and
   two bromine atoms attached to adjacent carbon atoms in the 5 and 6, the 6 and 7, or the 7 and 8 positions of said linear portion of said chain.

2. A flame-resistant polymeric composition in accordance with claim 1 wherein said polymer is selected from the group consisting of polyethylene, polypropylene, polystyrene, and polyester resin.

3. A flame-resistant polymeric composition according to claim 1 wherein said polymer is polyethylene and said brominated adduct is characterized by the formula

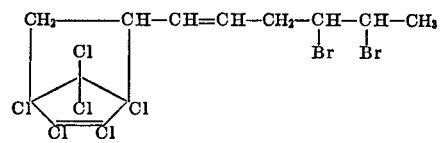

4. A flame-resistant polymeric composition according to claim 1 wherein said polymer is polyethylene and said brominated adduct is characterized by the formula

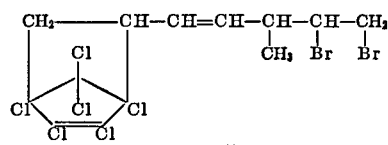

5. A flame-resistant polymeric composition according to claim 1 wherein said polymer is polypropylene and said brominated adduct is characterized by the formula

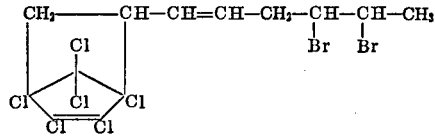

6. A flame-resistant polymeric composition according to claim 1 wherein said polymer is polypropylene and said brominated adduct is characterized by the formula

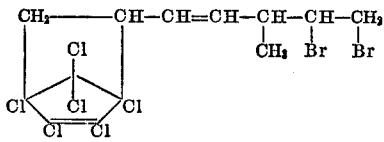

7. A flame-resistant polymeric composition according to claim 1 wherein said polymer is polystyrene and said brominated adduct is characterized by the formula

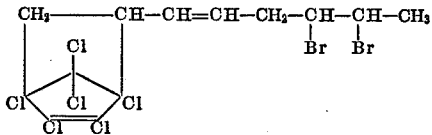

8. A flame-resistant polymeric composition according to claim 1 wherein said polymer is polystyrene and said brominated adduct is characterized by the formula

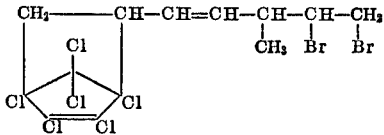

9. A flame-resistant polymeric composition according to claim 1 wherein said polymer is a polyester resin and said brominated adduct is characterized by the formula

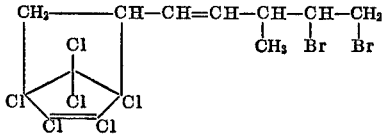

10. A flame-resistant polymeric composition according to claim 1 wherein said polymer is polyethylene.
11. A flame-resistant polymeric composition according to claim 1 wherein said polymer is polypropylene.
12. A flame-resistant polymeric composition according to claim 1 wherein said polymer is polystyrene.
13. A flame-resistant polymeric composition according to claim 1 wherein said polymer is a polyester resin.
14. A flame-resistant polymeric composition comprising a normally flammable polymer selected from the group consisting of polyethylene, polypropylene, copolymers of ethylene and butene, polyisobutylene, polymers of at least one monomer selected from the group consisting of conjugated dienes containing from 4 to 10 carbon atoms per molecule, polymers of monovinyl-substituted aromatic compounds containing from 8 to 10 carbon atoms per molecule, polymers of acrylonitrile, polymers of methylacrylate, polymers of methylmethacrylate, polyester resins, and mixtures thereof, and an effective fire-retardant proportion of a bromine-containing compound characterized by:

an acyclic carbon chain containing a total of 8 carbon atoms and from 7 to 8 carbon atoms in the linear portion of said chain;
the presence of a

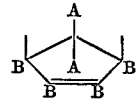

radical attached to the carbon atoms in the 1 and 2 positions in the linear portion of said chain; in said radical, each A is selected from the group consisting of chlorine, bromine, fluorine, hydrogen, R, and —OR wherein R is an alkyl or aryl radical containing from 1 to 10 carbon atoms, and each B is selected from the group consisting of chlorine, bromine, and fluorine;
a carbon to carbon double bond between the carbon atoms in the 3 and 4 positions in the linear portion of said chain; and
two bromine atoms attached to adjacent carbon atoms in the 5 and 6, the 6 and 7, or the 7 and 8 positions of said linear portion of said chain.

References Cited
UNITED STATES PATENTS

| | | | |
|---|---|---|---|
| 3,396,201 | 8/1968 | Weil et al. | 260—648 |
| 2,955,141 | 10/1960 | Schmerling | 260—648 |
| 3,222,249 | 12/1965 | Koremura et al. | 260—648 |
| 3,365,505 | 1/1968 | Norell | 260—648 |
| 2,028,715 | 1/1936 | Hanson | 252—8.1 |
| 2,951,099 | 8/1960 | Hoch | 260—648 |
| 3,004,935 | 10/1961 | Raley, Jr. et al. | 260—2.5 |
| 3,040,107 | 6/1962 | Hoch | 260—648 |
| 3,403,036 | 9/1968 | Hindersinn et al. | 260—45.75 |
| 3,418,384 | 12/1968 | Stapp | 260—648 |

DONALD E. CZAJA, Primary Examiner

R. A. WHITE, Assistant Examiner

U.S. Cl. X.R.

260—45.7 R, 45.75 B, 869

UNITED STATES PATENT OFFICE

CERTIFICATE OF CORRECTION

Patent No. 3,792,116     Carlos G. Cardenas and     Dated: February 12, 197
                       Donnie G. Brady It is certified that error appears in the above-identified patent and that s Letters Patent are hereby corrected as shown below:

Column 8, line 18, "acrylic" should read --- acyclic ---.

Signed and sealed this 17th day of September 1974.

(SEAL)
Attest:

McCOY M. GIBSON JR.                 C. MARSHALL DANN
Attesting Officer                   Commissioner of Patents